Patented Mar. 24, 1953

2,632,237

UNITED STATES PATENT OFFICE 2,632,237

METHOD OF MAKING A MECHANICAL JOINT BETWEEN ELECTRICAL CONDUCTORS

Mike A. Miller, New Kensington, Pa., assignor to Aluminum Company of America, Pittsburgh, Pa., a corporation of Pennsylvania No Drawing. Application June 20, 1950, Serial No. 169,293

16 Claims. (Cl. 29—155.55)

This invention relates to forming mechanical joints between metal electrical conductors as distinguished from soldered or welded joints, and it is especially concerned with reducing the electrical resistance offered by mechanical joints.

In electric power transmission systems it is frequently necessary to join one metal conductor unit, such as bus bars or cable, to another because, for most installations, it is not feasible, if not impossible, to employ a single continuous conductor from the generator to the machine or apparatus which consumes the power. Also, fittings must be attached to the conductors, particularly at terminals, which carry current and form a part of the transmission system. Although it is possible, and even desirable, in some instances to weld or solder one conductor to another, in many cases, especially in systems where heavy power loads are carried, the formation of such integral joints is not advantageous. For example, in installing bus bars, it is more convenient and usually much quicker to clamp or bolt them together than to weld them, and, likewise, such a mechanical joint is more easily disassembled than one which has been soldered or welded. Also, at times, it is necessary to join conductors of dissimilar metals, which presents some difficulties from a welding standpoint.

In speaking of mechanical joints it will be understood that this term is applied to those joints where contact between conductors is established and maintained by mechanical means. Thus, fittings may be compressed upon a conductor, or conductors may be bolted or clamped together. In all of these cases, a portion of the surface of one conductor is held in contact with a portion of the surface of another conductor by mechanical means. Usually the ends of the conductors are overlapped, rather than butted together, for forming a good durable joint.

Metal conductors generally are coated with a natural oxide film, especially metals such as aluminum, with the result that actual metal to metal contact is not established in a mechanical joint. Furthermore, such coatings offer considerably more resistance to the flow of electric current than does the metal. The resistance is also increased by a thickening of the oxide film such as occurs where the conductor becomes heated by passage of the current or by proximity to a source of heat. While the electrical resistance of a single joint may be very small, yet when multiplied by the number of joints throughout the system in which the current passes, the efficiency of power transmission is measurably affected. Moreover, if the joint is not properly protected, corrosion may occur between the overlapping surfaces and thus further increase the electrical resistance. For convenience this resistance to the flow of an electric current in mechanical joints may be called contact resistance.

One of the objects of this invention is to provide a method of assembling a mechanical joint between metallic electrical conductors whereby the electrical resistance of the joint is substantially reduced. Another object is to provide a method of forming a low resistance mechanical joint between metallic electrical conductors which will retain a low resistance value over a long period of time. Still another object is to provide a method of assembling a mechanical joint between aluminous metal conductors which will have low electrical resistance over a long period of time.

I have found that a low resistance joint can be formed between mechanically joined metallic electrical conductors by first applying certain treated amines or amides to that portion of the surface of at least one of the conductors which will be in contact with another conductor and assembling the conductors in joint relationship so that the treated amine, or amide, covers the overlapping or abutting surfaces between two or more of the conductors. To obtain the maximum reduction in electrical resistance the treated amine or amide should be provided at each of the interfaces between the joined conductors where more than two conductors are involved. Once the joint has been assembled with the treated amine or amide in place, no subsequent treatment of these materials or the joint is required to establish and maintain a low resistance in the joint. The simplicity of the application of the treated compounds to the conductors combined with the great effectiveness of these substances offer very important advantages in the construction and operation of a power transmission system. Still another advantage resides in the permanency of the lowered electrical resistance, for this effect remains as long as the treated compounds are present. Furthermore, the treated compounds can undergo heating, such as occurs during passage of a current through the line, and yet not lose their effectiveness in decreasing the electrical resistance of the joint. This stability of the compounds is of special value where heavy currents are carried, and the resistance of mechanical joints, if assembled according to previous practice, would normally increase with continued service. For the sake of convenient reference the treated compounds used to decrease the electrical or contact resistance in a mechanical joint will be called electrical joint compounds.

The electrical joint compounds which I employ are the products of the action, whether it be a reaction, absorption or solution, of an acidic fluorine-containing substance upon a substance selected from the group consisting of aliphatic, aromatic and heterocyclic amines and aliphatic amides and their substitution products. Those aliphatic hydroxy-, mono-, and polyamines which contain not more than 7 carbon atoms are generally characterized by solubility in water and immiscibility in the usual hydrocarbon greases or oils. On the other hand, the aliphatic, aromatic and heterocyclic amines and aliphatic amides containing 8 or more carbon atoms are usually insoluble in water and are miscible with hydrocarbon greases and oils. The term "insoluble," as here employed, means that the solubility, if any, is very slight, that is, insufficient to permit any leaching or washing out from the joint when exposed to water or a moist atmosphere. The term "miscibility" means that the treated amines and amides are mutually soluble in grease or oil whereas "immiscibility" refers to the opposite condition, namely, the compounds are not mutually soluble in all proportions with the usual mineral hydrocarbon greases and oils.

The physical form of the electrical joint compounds at room temperature varies with their composition, some being liquids while others are of a paste-like consistency. The choice of a particular compound may be influenced by its physical state and the desired method of applying it. Further, in some cases it may be desirable to use two or more compounds or to apply them in successive layers on the conductor surface. Also, in some instances it may be advantageous to admix inert substances with the joint compound where dilution of the compound has no material effect upon the contact resistance of the joint. Where a grease or oil is employed as the inert diluent the joint compound should be miscible therewith. Compounds of this character by themselves and in admixture with grease and oil are the subject of my co-pending application Serial No. 169,294, filed June 20, 1950. To obtain the desired viscosity in the compound or mixture to permit convenient application to the conductors, inert easily vaporizable solvents or vehicles, such as mineral spirits, may be added. They quickly evaporate and leave the mixture or compound in place.

Many of the electrical joint compounds exhibit the property of gelatinizing or becoming more viscous upon exposure to air of usual humidity. This change does not have an adverse effect upon the lowered electrical resistance but does tend to make the compounds more resistant to removal by mechanical means.

The amines and amides which are useful in preparing electrical joint compounds are of the classes defined as the aliphatic, aromatic and heterocyclic amines and the aliphatic amides, as has been mentioned above. The aliphatic amines may be of any one of three types, hydroxy-, mono-, or polyamine. Some amines and amides may be classified in more than one of the aliphatic groups and others may be classified in either the aromatic or heterocyclic groups or they may be classifiable in both aliphatic and cyclic groups where both are represented in a particular compound. Some examples of aliphatic amines which contain not more than 7 carbon atoms and represent the hydroxy-, mono-, and polyamine types are monoethanolamine, diethanolamine, triethanolamine, aminoethanolamine, diethylaminoethanol, monoisopropanolamine, butyl amine, amylamine, ethylene diamine, diethylene triamine, and triethylene tetramine. The following are representative of the aliphatic amines containing 8 or more carbon atoms: 2-ethylhexylamine, 3-di-n-amylaminopropylamine, di(2-ethylhexylamine), dodecylamine, didodecylamine, dioctadecylamine, trihexylamine and tri-n-amylamine. Examples of aromatic amines are phenyl ethanolamine, 3-phenylpropylamine, ethylphenylethanolamine, phenyldiethanolamine, o-dimethylaminoethyl-p-octyl phenol, octylphenoxyethoxyethyldimethylamine and 4-amino-3-pentadecyl phenol. The heterocyclic amines are illustrated by azoles, azolines, oxazolines, glyoxaline, azines, oxazines, morpholine and indole. Examples of aliphatic amides are n-hexadecane amide and n-ocetadecane amide.

To render the above types of amines effective for lowering the electrical resistance of mechanical joints, they must be treated with an acidic fluorine-containing substance such as $HF$, $BF_3$, $HBF_4$, $HB(OH)_2F_2$, $H_2SiF_6$, $HSO_3F$ and fluophosphoric acids or with compounds which upon decomposition yield the foregoing acidic substances. Of the acidic fluorine-containing compounds, $HF$ and $HBF_4$ are preferred because of the ease of adding these to the amine or amide. When an anhydrous highly effective product is desired $HF$ should be employed. The term, "acidic fluorine-containing substance," implies that the substance will yield an acid in water solution and exhibit other common acidic properties. The particular manner in which these substances are introduced to the amine or amide forms no part of this invention. However, the treatment should be of such a character that a measurable quantity of the fluorine-containing compound remains associated with the amine or amide. For practical purposes 0.5 to 60% by weight of the fluorine-containing acidic compounds may be considered as covering the useful range. Preferably these substances should be present in the proportion of 0.1 mol to each mol of amine or amide, but smaller amounts in combination with the amine or amide still yields an electrical joint compound capable of diminishing the contact resistance in a mechanical joint. Joint compounds containing as much as 1 mol or even 2 mols of the fluorine-containing compounds per mol of the amine or amide have been found to give satisfactory results but the proportion may vary with the particular composition being treated. Where $HF$ is employed highly useful results are obtained when it is present in the amount of 0.5 to 20% by weight of the amine or amide with which it is associated.

Although all of the above described treated amines and amides are effective in lowering the electrical resistance in a mechanical joint between metallic conductors, I have found that the hydroxy aliphatic amine and the substituted oxazoline products are especially suitable from the standpoints of physical form, odor, efficiency and availability.

While the electrical joint compounds may be used in a mechancial joint between any solid metallic electrical conductors they have proved to be especially valuable when used on those conductors which are coated with a natural oxide film. For example, they have been found to be particularly effective in reducing the electrical resistance in mechanical joints between aluminous conductors, particularly in bus bar installations. The term, "aluminous" is here used to designate both aluminum and the alloys containing more than 50% by weight of this metal. The tenacious oxide film on aluminous conductors forms so readily that it has been impossible to establish a direct metal to metal contact in a mechanical joint even though the metal is first cleaned and a heavy pressure is applied to the conductors at the joint. Through use of the electrical joint compounds herein described the electrical resistance in such joints is greatly reduced. Obviously, this is of considerable importance in a transmission system where there are numerous mechanical joints. Considerable reduction in contact resistance is effected by use of the joint compounds between conductors of copper and copper base alloys, tin or cadmium plated copper, steel and aluminum, as well as in joints between aluminous and other non-aluminous conductors.

The compounds can be successfully used on metal surfaces which are dirty or greasy but it is preferable to clean them first to assure maximum benefit from the compounds. Either mechanical or chemical cleaning will be satisfactory. Also, it is advisable to have the conductors as dry as possible when the compounds or mixtures containing the compounds are initially applied.

To assemble a mechanical joint containing the compounds herein described it is only necessary to apply them to the surface of one of the conductors forming the mechanical joint, since that will provide sufficient compound between the overlapping surfaces of adjacent conductors to lower the contact resistance. The compounds may be applied to the conductors in any suitable manner, such as by painting, or daubing, or by immersion in the liquid. The amount applied is not critical except that for best results the entire area of the overlapping surfaces should be covered with the compound when the conductors are assembled in joint relationship. Generally the compounds have no adverse effect upon the metal and hence any excess outside of the joint need not be removed. After the compounds have been applied the conductors are assembled and fastened in position in the usual fashion by clamps, bolts, compression in a press, or other means of establishing a mechanical joint. In the case of attaching a fitting to cable, the compounds may be applied to the cable and the fitting then pressed onto the cable.

The effect gained by interposing an electrical joint compound between the overlapping surfaces of electrical conductors is illustrated in the following examples. In these tests the contact resistance was magnified, as compared to the resistance between a pair of conductors, by stacking six wafers of aluminum of a minimum purity of 99.3% between bars of the same metal. The wafers were 7/8" square and 1/8" in thickness. One surface of each wafer was grooved so that only about 50% of the total surface area would contact the back of the adjoining wafer or bar. This arrangement served to accentuate any contact resistance effects. The bars were of the same width as the wafers and were 1/4" in thickness. The assembly was mounted in a fixture and pressed together by tightening nuts on bolts with a torque wrench to apply a pressure of 3500 lbs. In order to provide the same kind of metal surface for each test, the wafers and bars were first etched in a 5% NaOH aqueous solution for 10 minutes, removed and immersed in a 50% $HNO_3$ solution for 5 seconds, after which they were withdrawn, washed and dried. An initial test was made of the assembly without any compound between the contacting surfaces. In each of the subsequent tests the amine or amide treated with HF, $HBF_4$, $HB(OH)_2F_2$, or the mixture containing them, was painted or daubed on one surface of each wafer or bar so that the compound would be present at each contacting surface in the assembly. The proportion of HF, $HBF_4$ or $HB(OH)_2F_2$ to the amine or amide was intentially varied. The resistance was measured by observing the potential drop across the joint under a current of about 3 amperes. The amines tested, the acidic fluorine-containing substance used and its proportion to the amine and the average electrical resistance of two or more tests with each compound are set forth in the table below.

*Electrical resistance of test joints*

| Amine, Amide or Mixture and Amount Used | Acidic Fluorine-Containing Substance and Amount Present | Average Electrical Resistance in Michroms |
|---|---|---|
| None | None | 98.5 |
| 74% Monoethanolamine | 26% $HBF_4$ | 10.4 |
| 87% Triethanolamine | 13% $HBF_4$ | 13.6 |
| 83% Aminoethylethanolamine | 17% $HBF_4$ | 9.5 |
| 42% Monoethanolamine | 58% $HB(OH)_2F_2$ | 11.6 |
| 84% Aminoethylethanolamine | 16% HF | 9.7 |
| 90% Phenylethanolamine | 10% HF | 10.8 |
| 58% Aminoethylethanolamine 30% hydroxydiphenylamine | 12% $HBF_4$ | 15.3 |
| 45% substituted oxazoline having mol. wt. of 350, and 50% petrolatum | 5% HF | 11.1 |
| 45% substituted oxazoline having mol. wt. of 350, 1% n-octadecane amide and 49% petrolatum | 5% HF | 17.5 |
| 72% n-dodecylamine 25% petrolatum | 3% HF | 9.0 |
| 30% 1-hydroxyethyl-2-heptadecenyl glyoxalidine, 33% petrolatum and 33.7% mineral spirits | 3.3% HF | 11.5 |
| 76% substituted 2-heptadecyl imidazole, 15.5% ethylene bis-iminodiacetic acid | 8.5% HF | 10.0 |

It will be seen that the electrical joint compounds effected a very substantial reduction in the contact resistance of the joints. In some cases the resistance was only about 1/10 that of the joint without any compound.

This application is a continuation-in-part of my co-pending application Serial No. 719,120, filed December 28, 1946.

Having thus described my invention and certain embodiments thereof which serve as illustrations and not limitations I claim:

1. The method of making a mechanical joint between overlapping metallic electrical conductors comprising applying to the portion of at least one of said conductors which will be included in said joint a joint compound composed of the product formed by the action of an acidic fluorine-containing substance upon a substance selected from the group composed of the aliphatic, aromatic and heterocyclic amines and aliphatic amides, and assembling the conductors in joint relationship such that said product is between the overlapping surfaces of adjacent conductors.

2. The method of making a mechanical joint between overlapping aluminous electrical conductors comprising applying to the portion of at least one of said aluminous conductors which will be included in said joint a joint compound composed of the product formed by the action of an acidic fluorine-containing substance upon a substance selected from the group composed of the aliphatic, aromatic and heterocyclic amines and aliphatic amides, and assembling the aluminous conductors in joint relationship such that the said product is between overlapping surfaces of adjacent conductors.

3. In the art of reducing the contact resistance between solid metallic electrical conductors, the process consisting of forming a product by the action of an acidic fluorine-containing substance upon a substance selected from the group composed of the aliphatic, aromatic and heterocyclic amines and aliphatic amides, applying said product to that portion of at least one of said conductors which will adjoin another conductor and assembling the conductors in joint relationship such that the said product is between adjoining surfaces of said conductors.

4. In the art of reducing the contact resistance between aluminous electrical conductors, the process consisting of forming a product by the action of an acidic fluorine-containing substance upon a substance selected from the group composed of the aliphatic, aromatic and heterocyclic amines and aliphatic amides, applying said product to that portion of at least one of said aluminous conductors which will adjoin another conductor and assembling the conductors in joint relationship such that the said product is between adjoining surfaces of said conductors.

5. In the art of reducing the contact resistance between solid metallic electrical conductors, the process consisting of forming a product by the action of an acidic fluorine-containing substance upon a substance selected from the group composed of the aliphatic, aromatic and heterocyclic amines and aliphatic amides, the ratio of said acidic fluorine-containing substance to the amine or amide being at least 0.1 mol of the former to 1 mol of the latter, applying said product to that portion of at least one of said conductors which will adjoin another conductor and assembling the conductors in joint relationship such that the said product is between adjoining surfaces of said conductors.

6. The method of making a mechanical joint between overlapping metallic electrical conductors comprising applying to the portion of at least one of said conductors which will be included in said joint a joint compound composed of the product formed by the action of an acidic fluorine-containing substance upon an aliphatic amine selected from the group composed of the hydroxy-, mono-, and polyamines wherein the total number of carbon atoms does not exceed 7, and assembling the conductors in joint relationship such that the said product is between the overlapping surface of adjacent conductors.

7. The method of making a mechanical joint between overlapping aluminous electrical conductors comprising applying to the portion of at least one of said aluminous conductors which will be included in said joint a joint compound composed of the product formed by the action of an acidic fluorine-containing substance upon an aliphatic amine selected from the group composed of the hydroxy-, mono-, and polyamines wherein the total number of carbon atoms does not exceed 7, and assembling the said aluminous conductors in joint relationship such that the said product is between overlapping surfaces of adjacent conductors.

8. The method of making a mechanical joint between overlapping metallic electrical conductors comprising applying to the portion of at least one of said conductors a joint compound comprised of the product formed by the action of $HBF_4$ upon an hydroxy aliphatic amine wherein the total number of carbon atoms does not exceed 7, and assembling the said conductors in joint relationship such that the said product is between overlapping surfaces of adjacent conductors.

9. The method of making a mechanical joint between overlapping metallic electrical conductors comprising applying to the portion of at least one of said conductors which will be included in said joint, a joint compound composed of the product formed by the action of hydrofluoboric acid upon an aliphatic amine selected from the group composed of hydroxy-, mono-, and polyamines wherein the total number of carbon atoms does not exceed 7, and assembling the conductors in joint relationship such that the said product is between the overlapping surfaces of adjacent conductors.

10. In the art of reducing the contact resistance between solid metallic electrical conductors, the process consisting of forming a product by the action of an acidic fluorine-containing substance upon an aliphatic amine selected from the group composed of the hydroxy-, mono-, and polyamines wherein the total number of carbon atoms does not exceed 7, applying said product to that portion of at least one of said conductors which will adjoin another conductor and assembling the conductors in joint relationship such that the said product is between adjoining surfaces of said conductors.

11. In the art of reducing the contact resistance between aluminous electrical conductors, the process consisting of forming a product by the action of an acidic fluorine-containing substance upon an aliphatic amine selected from the group composed of the hydroxy-, mono-, and polyamines wherein the total number of carbon atoms does not exceed 7, applying said product to that portion of at least one of said conductors which will adjoin another conductor and assembling the conductors in joint relationship such that the said product is between adjoining surfaces of said conductors.

12. In the art of reducing the contact resistance between solid metallic electrical conductors, the process consisting of forming a product by the action of $HBF_4$ upon an hydroxy aliphatic amine wherein the total number of carbon atoms does not exceed 7, applying said product to that portion of at least one of said conductors which will adjoin another conductor and assembling the conductors in joint relationship such that the said product is between adjoining surfaces of said conductors.

13. In the art of reducing the contact resistance between solid metallic electrical conductors, the process consisting of forming a product by the action of an acidic fluorine-containing substance upon an aliphatic amine selected from the group composed of the hydroxy-, mono-, and polyamines wherein the total number of carbon atoms does not exceed 7, the ratio of said acidic fluorine-containing substance to the amine being at least 0.1 mol of the former to 1 mol of the latter, applying said product to that portion of at least one of said conductors which will adjoin another conductor and assembling the conductors in joint relationship such that the said product is between adjoining surfaces of said conductors.

14. The method of making a mechanical joint between overlapping metallic electrical conductors comprising applying to the portion of at least one of said conductors which will be included in said joint a joint compound composed of the product formed by the action of hydrofluoric acid upon a substance selected from the group composed of the aliphatic, aromatic and heterocyclic amines and aliphatic amides containing 8 or more carbon atoms, and assembling said conductors in joint relationship such that said product is between the overlapping surfaces of adjacent conductors.

15. In the art of reducing the contact resistance between solid metallic electrical conductors, the process consisting of forming a product by the action of hydrofluoric acid upon a substance selected from the group composed of the aliphatic, aromatic and heterocyclic amines and aliphatic amides containing 8 or more carbon atoms, applying said product to that portion of at least one of said conductors which will adjoin another conductor and assembling the conductors in joint relationship such that the said product is between adjoining surfaces of said conductors.

16. In the art of reducing the contact resistance between solid metallic electrical conductors the process consisting of forming a product by the action of hydrofluoric acid upon a substance selected from the group consisting of the aliphatic, aromatic and heterocyclic amines and aliphatic amides containing 8 or more carbon atoms, the acid content of said product constituting between 0.5 and 20% of its weight, applying said product to that portion of at least one of said conductors which will adjoin another conductor and assembling the conductors in joint relationship such that the said product is between adjoining surfaces of said conductors.

MIKE A. MILLER.

REFERENCES CITED

The following references are of record in the file of this patent:

UNITED STATES PATENTS

| Number | Name | Date |
|---|---|---|
| 2,155,307 | Hagemann | Apr. 18, 1939 |
| 2,238,069 | Miller | Apr. 15, 1941 |
| 2,286,298 | Miller | June 16, 1942 |
| 2,291,400 | Miller | July 28, 1942 |
| 2,333,206 | Sloan | Nov. 2, 1943 |
| 2,423,290 | Bonwitt | July 1, 1947 |